(12) United States Patent
Al-Yami

(10) Patent No.: US 10,580,283 B1
(45) Date of Patent: Mar. 3, 2020

(54) SECURE ENTERPRISE EMERGENCY NOTIFICATION AND MANAGED CRISIS COMMUNICATIONS

(71) Applicant: Saudi Arabian Oil Company, Dhahran (SA)

(72) Inventor: Rashed M. Al-Yami, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/117,743

(22) Filed: Aug. 30, 2018

(51) Int. Cl.
| | |
|---|---|
| G08B 21/00 | (2006.01) |
| G08B 21/10 | (2006.01) |
| G08B 25/00 | (2006.01) |
| B64C 39/02 | (2006.01) |
| G08B 25/10 | (2006.01) |

(52) U.S. Cl.
CPC ............ G08B 21/10 (2013.01); B64C 39/024 (2013.01); G08B 25/004 (2013.01); G08B 25/006 (2013.01); B64C 2201/127 (2013.01); G08B 25/10 (2013.01)

(58) Field of Classification Search
CPC .... G08B 21/10; G08B 25/006; G08B 25/004; G08B 25/10; B64C 39/024; B64C 2201/127
USPC ........................................................ 340/540
See application file for complete search history.

(56) References Cited

U.S. PATENT DOCUMENTS

| 7,212,111 B2 | 5/2007 | Tupler et al. |
| 7,277,018 B2 | 10/2007 | Reyes et al. |
| 2005/0091368 A1 | 4/2005 | Ozburn |
| 2005/0245232 A1 | 11/2005 | Jakober |
| 2008/0189721 A1 | 8/2008 | Buchanan |
| 2009/0002145 A1 | 1/2009 | Berry et al. |
| 2012/0299751 A1 | 11/2012 | Verna |
| 2012/0326858 A1 | 12/2012 | Daly et al. |
| 2015/0339911 A1 | 11/2015 | Coyne |
| 2017/0251633 A1* | 9/2017 | Womble ................ A61B 34/10 |

(Continued)

OTHER PUBLICATIONS

PCT International Search Report and Written Opinion issued in International Application No. PCT/US2019/048341 dated Dec. 10, 2019, 14 pages.

*Primary Examiner* — Tanmay K Shah
(74) *Attorney, Agent, or Firm* — Fish & Richardson P.C.

(57) ABSTRACT

A computer-implemented system includes the following. A recipient-information-receiving interface is configured to receive up-to-date recipient information for recipients located worldwide. Each information-receiving interface of a plurality of information-receiving interfaces is configured to receive emergency information from a particular external source at a particular worldwide location. The emergency information includes one or more of electronic, textual, audio, and visual information. Processors are configured to aggregate the emergency information received from the plurality of information-receiving interfaces and generate aggregated information for transmission to recipients identified by the up-to-date recipient information. A plurality of information-transmitting interfaces are configured to transmit encrypted aggregated information to recipients identified by the up-to-date recipient information. The encrypted aggregated information includes live video streaming.

20 Claims, 2 Drawing Sheets

(56) References Cited

U.S. PATENT DOCUMENTS

2018/0322197 A1* 11/2018 Hesterman ............... H04Q 9/02
2019/0003918 A1* 1/2019 Li ..................... G01N 21/3504

* cited by examiner

US 10,580,283 B1

SECURE ENTERPRISE EMERGENCY NOTIFICATION AND MANAGED CRISIS COMMUNICATIONS

BACKGROUND

The present disclosure applies to emergency response systems. Many existing enterprise emergency response notification and communications systems support a single communications medium such as telephone or a specific radio network. For example, terrestrial trunked radio (TETRA) can be used for a communications platform for public safety, transportation, and emergency response teams to reach to key personnel during emergencies. However, emergency response systems that cover a single or small handful of communication channels and protocols fall short of being an all-inclusive mechanism for connecting key personnel through multiple systems during a manmade or natural disaster.

SUMMARY

The present disclosure describes techniques that can be used for providing a central, all-inclusive system for providing secure enterprise emergency notification and managed crisis communications. In some implementations, a computer-implemented system includes the following. A recipient-information-receiving interface is configured to receive up-to-date recipient information for recipients located worldwide. Each information-receiving interface of a plurality of information-receiving interfaces is configured to receive emergency information from a particular external source at a particular worldwide location. The emergency information includes one or more of electronic, textual, audio, and visual information. Processors are configured to aggregate the emergency information received from the plurality of information-receiving interfaces and generate aggregated information for transmission to recipients identified by the up-to-date recipient information. A plurality of information-transmitting interfaces are configured to transmit encrypted aggregated information to recipients identified by the up-to-date recipient information. The encrypted aggregated information includes live video streaming.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, a single central system can interface with a comprehensive set of systems that are not handled by any other system. For example, the single central system can capture all emergency notification and communication requirements for notifying all key personnel required to be notified during an emergency. Second, the single central system can initiate an automatic activation of an emergency plan. Third, for a large enterprise that owns and operates their own communications infrastructure, the single central system can provide emergency commanders with the capability of bringing together all needed personnel, regardless of the means of communications. Fourth, the single central system can provide up-to-date contact information of all key members of the emergency response plan by leveraging human resources (HR) system information, without relying on manual updates. Fifth, the single central system can include live broadcasting of real-time video streaming from an emergency location using a video streaming capability that is integrated within the system.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for providing a single central system for emergency notification and managed crisis communications. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and since as such details are within the skill of one of ordinary skill in the art. The present disclosure is not intended to be limited to the described or illustrated implementations, but to be accorded the widest scope consistent with the described principles and features.

The present disclosure describes a new system and method that provides comprehensive computing and communications platform that can be fully integrated and capable of delivering secure communications including email, text messages, unified communications, telephones, dynamic setup mobile groups, satellite, and radio patching. The secure communications can be sent to terrestrial trunked radio (TETRA), trunking, and conventional very high frequency (VHF), ultra-high frequency (UHF), high frequency (HF) aviation and marine systems, in addition to interfacing with drones to receive live streaming video, as well as providing secure encrypted communications links to government agencies and media.

Figure 1:
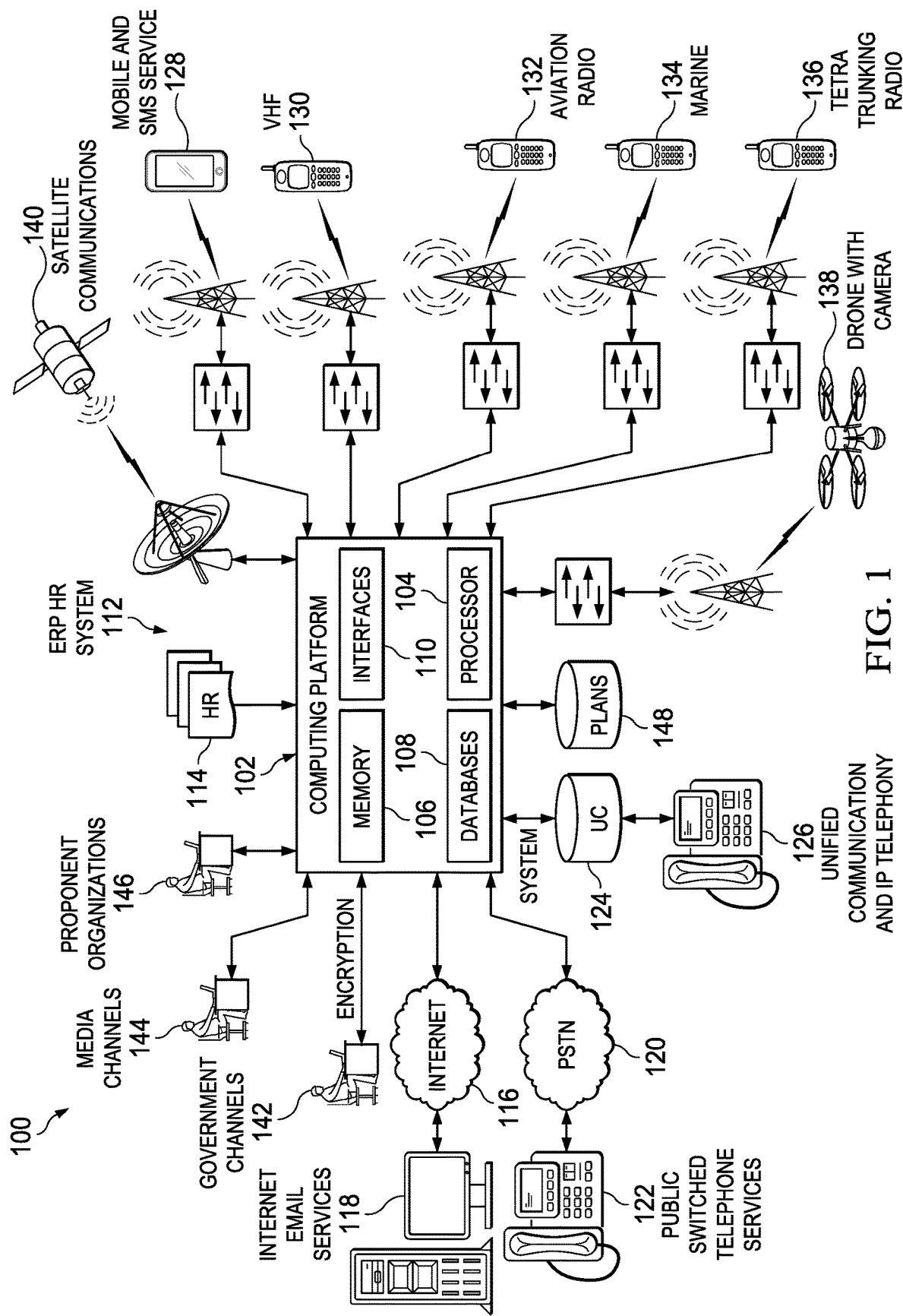
FIG. 1 is a block diagram illustrating an example of a system that serves as a single, central system of emergency notification and managed crisis communications, according to some implementations of the present disclosure.

FIG. 1 is a block diagram illustrating an example of a system 100 that serves as a single, central system of emergency notification and managed crisis communications, according to some implementations of the present disclosure. The system 100 includes a computing platform 102 that performs data collection, processing, communication, and notification for the system 100. The computing platform 102 includes a processor 104 (for example, a central processing unit (CPU) 104), memory 106, databases 108, and interfaces 110. The interfaces 110 include multiple different interfaces that are each configured to communicate with one or more components of the system 100 that are outside of the computing platform 102.

The interfaces 110 can include a recipient-information-receiving interface that is configured to receive up-to-date recipient information for recipients located worldwide. The recipients can be defined using the system 100, for example, so that the recipients can be notified by the system 100 when emergency arises that is pertinent to specific recipients. The up-to-date recipient information can be received from a direct human resources (HR) feed. For example, one or more HR systems can be configured to automatically push updated recipient information, including contact information, to the computing platform 102. In some implementations, the computing platform 102 can be configured to request information from recipient information sources, including HR systems, on a scheduled bases or on an as-needed basis, for example, to initially populate recipient-related databases under control of the computing platform 102.

The interfaces 110 can include multiple information-receiving interfaces. Each information-receiving interface can be configured to receive, from a particular external source at a particular worldwide location, one or more of electronic, textual, audio, and visual information. The received information can include information obtained from man-made catastrophes and natural disasters, including from more than one location at the same time. The particular external sources can include websites that provide information over the Internet and satellite sources that provide information obtained from satellites.

The processor 104 can include multiple processors, including a processor that is configured to aggregate information received from the multiple information-receiving interfaces and generate aggregated information for transmission to recipients identified by the up-to-date recipient information. Aggregation can include the use of rules that indicate how information that is received is to be combined, such as to combine video with a textual news feed.

The interfaces 110 can include multiple information-transmitting interfaces that are configured to transmit encrypted aggregated information to recipients identified by the up-to-date recipient information. The encrypted aggregated information can include live video streaming.

Database modules of the system 100 can be used to interface with an enterprise resource planning (ERP) system 112, including HR modules for interacting with HR information 114. For example, the HR information 114 can include employee data and other information identifying personnel that are to be contacted in an emergency. The information can include contact information such as cell phone numbers, email addresses, geographic locations, responsibilities, and chain-of-command information. The interfaces 110 associated with the HR information 114 can assure that up-to-date contact information of key personnel is always available through the HR module, for example, to a system database module included in the interfaces 110. The system database module can provide access to up-to-date contact information of key personnel at all times.

The communications interfaces (for example, the interfaces 110) can link the system 100 to Internet email gateways available through a network (for example, including the Internet 116). The Internet email gateways can facilitate notifications and communications with all key personnel over Internet email services 118.

The communications interfaces (for example, the interfaces 110) can support multiple audio protocols. For example, the interfaces can provide access to a public switched telephone network (PSTN) 120 that networks public switches telephone services 122. The interfaces can also provide access to fourth generation (4G) and fifth generation (5G) global system for mobile (GSM) mobile phone networks and short message service (SMS) services 128 for voice and text messages, unified communications (UC) networks 124 for communicating with unified communications and Internet protocol (IP) telephony networks 126, UHF radio networks, VHF radio networks 130, high-frequency (HF) aviation radio networks 132, HF marine radio networks 134, TETRA networks 136, and very small aperture terminal (VSAT) networks. Through these communications interfaces, the system 100 can be linked to all communications systems and networks, allowing easy reach to all key personnel regardless of the network they are using during the emergency.

The communications interfaces (for example, the interfaces 110) can also support video protocols and communications over 4G GSM networks, long-term evolution (LTE), and 5G GSM networks from unmanned aerial vehicles (UAVs). The UAVs can include, for example, drones with cameras 138 that can broadcast live video from disaster locations and UAVs that are used in a search operation. Interfaces 110 can also communicate with satellite communications 140.

The interfaces 110 can provide secure encrypted links to government agencies through government channels 142 to share audio communications, text communications, and live video from disaster locations. The computing interfaces can also support protocols for communications and updates to media channels 144, such as to share messages and video that can be broadcast immediately or recorded for later.

In some implementations, interfaces 110 can include a plan-information interface that is configured to interface with personnel belonging to business units who can interface with the system 100 to establish their applicable plans 148. The plans can include, for example, business continuity plans, emergency response plans, disaster recovery plans, and incident response plans. Each plan can define key personnel and other entities to be notified in case of an emergency. Users who are representatives of the business units, for example, can use user interfaces (for example, provided by the interfaces 110) for defining the plans 148. Plans 148 can be customized to indicate which personnel and entities are to be contacted based on one or more of an emergency type, a time of day, a current emergency status level, and other factors.

The user interfaces can include interfaces to ERP and HR modules. The system 100 can also be interfaced with enterprise communications platforms. Whenever an emergency scenario arises, an emergency commander can access the system 100 to perform emergency-related tasks. For example, the emergency commander can perform tasks for (or initiate emergency responses for) one or more affected specific enterprise. Several plans can be activated at the same time or can be merged together. Global activation of several or all plans can be achieved.

Access to the computing platform 102 (including the ability to create plans and access information) can be limited, for example, to personnel from proponent organizations who are authorized to access the system. Different access levels can be provided based, for example, on the responsibilities and position of personnel in each organization. The system 100 can include different databases 108 and plans 148 that pertain to the different proponent organizations. Plans can be linked to the enterprise organization structure of each organization. Each plan can include one or more lists of key personnel (for example, identified by name or position). The contact information can include email addresses, office telephone numbers, mobile telephone numbers, and other emergency contact information as needed. The contact information can also include contact information for back-up personnel that can be used if key personnel cannot be reached or if a response or acknowledgement is not received within a threshold response time.

The HR system 114 can provide interfaces (including user interfaces and automatic software updates) that facilitate the provision or extraction of up-to-date contact information of key personnel. When a given position for a person is added to an emergency response plan, for example, the emergency contact information can be retrieved.

During an emergency or in certain other situations (for example, disaster recovery testing), multiple plans can be activated simultaneously and, as needed, merged. Plans can be hierarchical, for example, being constructed of multiple sub-plans. Plans can include specific instructions regarding which personnel or entities are to be contacted first or in which order, such as to prioritize notifications based on importance of communication.

Users of the system 100, including personnel of proponent organizations, can add their own organizations' plans (for example, emergency response plan, business continuity plan, disaster recovery plan, cybersecurity incident response plan) into the system 100 (for example, to the plans 148). Multiple organizational units that report to a common higher organization can establish a single, common plan. For example, a unified plan can be created by multiple organizations that are of a same organization type or within a common organizational hierarchy. Key personnel can be added in each plan based on their enterprise credentials.

Plans can include additional numbers, for example, for emergency control centers, network operations centers, security operations centers, operation control centers, and satellite phone numbers for ships and supertankers. For example, a given plan can include radio channels and talk groups using TETRA, trunking, or conventional (VHF, UHF, HF, aviation, or marine) radio systems.

During an emergency, an organization's representative can activate their organization's plan or simultaneously activate multiple plans based on the emergency response requirements. Upon emergency activation, one or more of email and SMS text message can be sent to all key personnel defined in the plan, notifying the key personnel of the emergency. The system 100 can support and activate group conference calls that can be established with all listed telephone numbers over PSTN, IP Unified Communications, or satellite networks. Radio channels and talk groups can be patched into the telephone conference calls.

Figure 2:
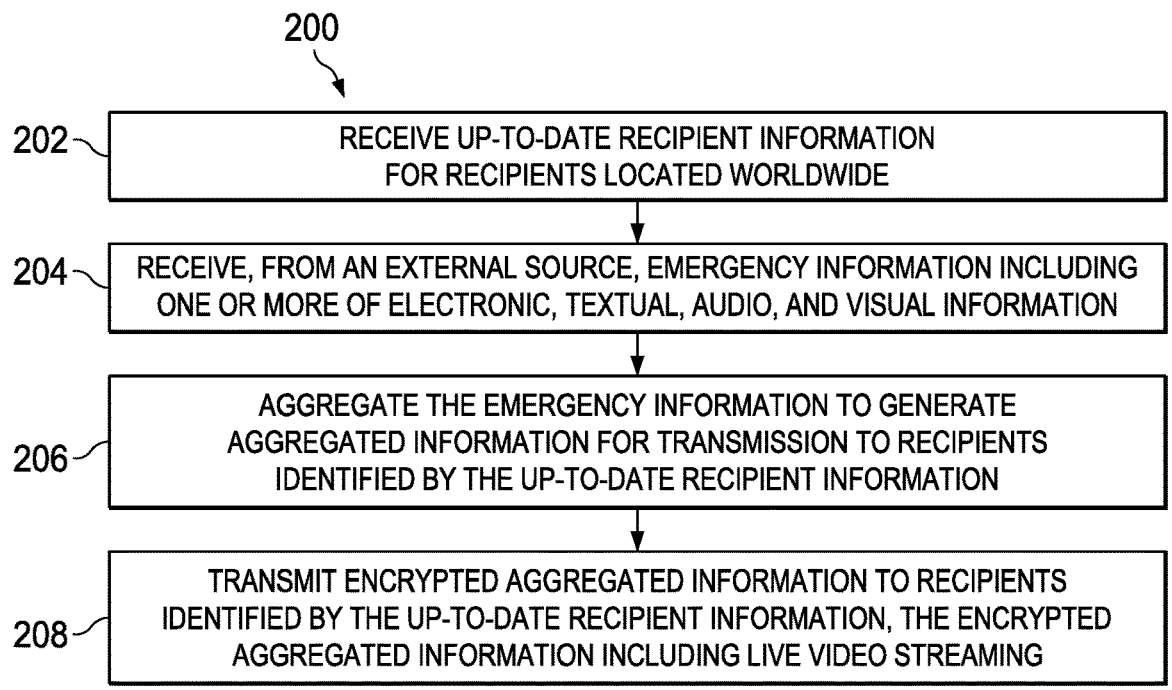
FIG. 2 is a flowchart of an example method for providing emergency notification and managed crisis communications, according to some implementations of the present disclosure.

FIG. 2 is a flowchart of an example method 200 for providing emergency notification and managed crisis communications, according to some implementations of the present disclosure. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 202, up-to-date recipient information is received for recipients located worldwide. For example, the computing platform 102 can receive recipient information from HR system 114. From 202, method 200 proceeds to 204.

At 204, emergency information is received from an external source. The emergency information includes one or more of electronic, textual, audio, and visual information. As an example, one or more of the components of the system 100 outside of the computing platform 102 can send a message to the computing platform 102 that an emergency is occurring. In another example, an organization's representative can log into an interface of the computing platform 102 and activate their organization's plan or simultaneously activate multiple plans based on a known emergency. From 204, method 200 proceeds to 206.

At 206, the emergency information is aggregated to generate aggregated information for transmission to recipients identified by the up-to-date recipient information. For example, the computing platform 102 can generate aggregated information based on the received information. The aggregated information can be packaged for preparation to be sent to various recipients, such as identified by the plans 148. The aggregated information can vary by recipient, for example, as some recipients can be defined, in particular plans 148, to receive particular subsets of information. From 206, method 200 proceeds to 208.

At 208, encrypted aggregated information is transmitted to recipients identified by the up-to-date recipient information. The encrypted aggregated information includes live video streaming. As an example, the computing platform 102 can send notifications to components of the system 100 outside of the computing platform 102, where the recipients are defined in the plans 148 or the databases 108. After 208, method 200 stops.

In some implementations, method 200 can further include sending one or more notifications to an administrator or manager specifying that an emergency notification has been sent to affected recipients and organizations. In some implementations, if the administrator or manager determines that the emergency is a false alarm, then the administrator or manager can use an interface 110 to trigger the distribution of false alarm notifications to known recipients of the initial notification (including the encrypted aggregated information).

Figure 3:
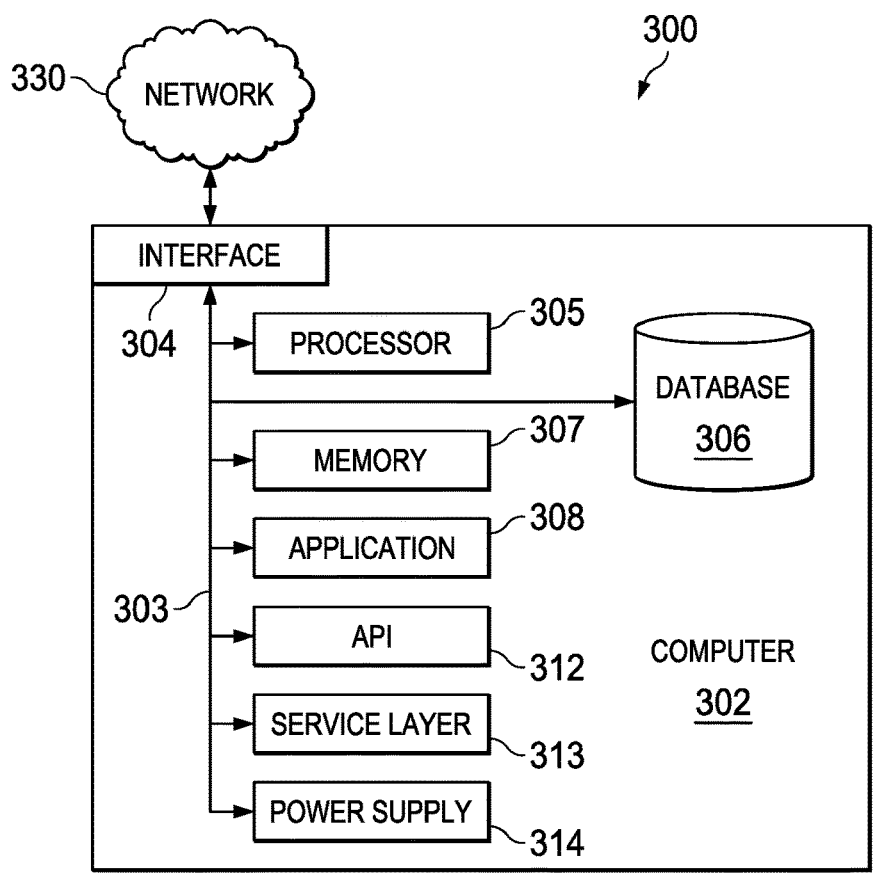
FIG. 3 is a block diagram illustrating an example computer system used to provide computational functionalities associated with described algorithms, methods, functions, processes, flows, and procedures as described in the instant disclosure, according to some implementations of the present disclosure.

FIG. 3 is a block diagram of an example computer system 300 used to provide computational functionalities associated with described algorithms, methods, functions, processes, flows, and procedures, as described in the instant disclosure, according to some implementations of the present disclosure. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 302 may comprise a computer that includes an input device, such as a keypad, keyboard, or touch screen that can accept user information, and an output device that conveys information associated with the operation of the computer 302, including digital data, visual, or audio information (or a combination of information), or a graphical-type user interface (UI) (or GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or a combination of environments.

At a high level, the computer 302 is an electronic computing device operable to receive, transmit, process, store, or manage data and information associated with the described subject matter. According to some implementations, the computer 302 may also include or be communicably coupled with an application server, email server, web server, caching server, streaming data server, or a combination of servers.

The computer 302 can receive requests over network 330 from a client application (for example, executing on another computer 302) and respond to the received requests by processing the received requests using an appropriate software application(s). In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, hardware or software (or a combination of both hardware and software), may interface with each other or the interface 304 (or a combination of both), over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other language providing data in extensible markup language (XML) format or other format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems that are connected to the network 330 (whether illustrated or not) in a distributed environment. Generally, the interface 304 comprises logic encoded in software or hardware (or a combination of software and hardware) and is operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory or conventional database. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 or other components (or a combination of both) that can be connected to the network 330 (whether illustrated or not). Memory 307 can store any data consistent with this disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, or applications. Further, although illustrated as a single application 308, the application 308 may be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either useror non-user-replaceable. In some implementations, the power supply 314 can include power-conversion or management circuits (including recharging, standby, or other power management functionality). In some implementations, the power-supply 314 can include a power plug to allow the computer 302 to be plugged into a wall socket or other power source to, for example, power the computer 302 or recharge a rechargeable battery.

There may be any number of computers 302 associated with, or external to, a computer system containing computer 302, each computer 302 communicating over network 330. Further, the term "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented system includes the following. A recipient-information-receiving interface is configured to receive up-to-date recipient information for recipients located worldwide. Each information-receiving interface of a plurality of information-receiving interfaces is configured to receive emergency information from a particular external source at a particular worldwide location. The emergency information includes one or more of electronic, textual, audio, and visual information. Processors are configured to aggregate the emergency information received from the plurality of information-receiving interfaces and generate aggregated information for transmission to recipients identified by the up-to-date recipient information. A plurality of information-transmitting interfaces are configured to transmit encrypted aggregated information to recipients identified by the up-to-date recipient information. The encrypted aggregated information includes live video streaming.

The foregoing and other described implementations can each, optionally, include one or more of the following features:

A first feature, combinable with any of the following features, wherein the plurality of information-receiving interfaces include communications interfaces supporting video protocols and communications over 4G and 5G GSM networks from UAV drones that broadcast live video from disaster locations.

A second feature, combinable with any of the previous or following features, wherein the emergency information includes audio captured from microphones located at remote locations, and audio and video received from UAVs.

A third feature, combinable with any of the previous or following features, wherein the received information includes information obtained from man-made catastrophes and natural disasters.

A fourth feature, combinable with any of the previous or following features, wherein the particular external sources include websites that provide information over the Internet.

A fifth feature, combinable with any of the previous or following features, wherein the particular external sources include satellite sources that provide information obtained from satellites.

A sixth feature, combinable with any of the previous or following features, further comprising a plan-information interface configured to receive plan information for plans defined by personnel at business units and initiate the plans based on emergency information received during an emergency.

A seventh feature, combinable with any of the previous or following features, wherein the plans include business continuity plans, emergency response plans, disaster recovery plans, and incident response plans.

In a second implementation, a computer-implemented method comprising the following. Up-to-date recipient information for recipients located worldwide is received. Emergency information is received from a particular external source at a particular worldwide location. The emergency information includes one or more of electronic, textual, audio, and visual information. The emergency information received from the plurality of information-receiving interfaces is aggregated, and aggregated information is generated for transmission to recipients identified by the up-to-date recipient information. Encrypted aggregated information is transmitted to recipients identified by the up-to-date recipient information. The encrypted aggregated information includes live video streaming.

The foregoing and other described implementations can each, optionally, include one or more of the following features:

A first feature, combinable with any of the following features, wherein the plurality of information-receiving interfaces include communications interfaces supporting video protocols and communications over 4G and 5G GSM networks from UAV drones that broadcast live video from disaster locations.

A second feature, combinable with any of the previous or following features, wherein the emergency information includes audio captured from microphones located at remote locations, and audio and video received from UAVs.

A third feature, combinable with any of the previous or following features, wherein the received information includes information obtained from man-made catastrophes and natural disasters.

A fourth feature, combinable with any of the previous or following features, wherein the particular external sources include websites that provide information over the Internet.

A fifth feature, combinable with any of the previous or following features, wherein the particular external sources include satellite sources that provide information obtained from satellites.

A sixth feature, combinable with any of the previous or following features, further comprising receiving plan information for plans defined by personnel at business units and initiating the plans based on emergency information received during an emergency.

A seventh feature, combinable with any of the previous or following features, wherein the plans include business continuity plans, emergency response plans, disaster recovery plans, and incident response plans.

An eighth feature, combinable with any of the previous or following features, wherein receiving the up-to-date recipient information includes receiving recipient information from a direct HR feed.

In a third implementation, a non-transitory, computer-readable medium storing one or more instructions executable by a computer system to perform operations comprising the following. Up-to-date recipient information for recipients located worldwide is received. Emergency information is received from a particular external source at a particular worldwide location. The emergency information includes one or more of electronic, textual, audio, and visual information. The emergency information received from the plurality of information-receiving interfaces is aggregated, and aggregated information is generated for transmission to recipients identified by the up-to-date recipient information.

Encrypted aggregated information is transmitted to recipients identified by the up-to-date recipient information. The encrypted aggregated information includes live video streaming.

A first feature, combinable with any of the following features, wherein the plurality of information-receiving interfaces include communications interfaces supporting video protocols and communications over 4G and 5G GSM networks from UAV drones that broadcast live video from disaster locations.

A second feature, combinable with any of the previous or following features, wherein the emergency information includes audio captured from microphones located at remote locations, and audio and video received from UAVs.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, or subroutine. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references to the various objects. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or a combination of communication types between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in the present disclosure can be any file system type accessible from multiple servers for read and update. Locking or consistency tracking is not necessary since the locking of exchange file system can be done at application layer. Furthermore, Unicode data files are different from non-Unicode data files.

While this specification contains many specific implementation details, these should not be construed as limitations on the scope of the present disclosure or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented system comprising:
a recipient-information-receiving interface configured to receive up-to-date recipient information for recipients located worldwide, wherein the recipients are members of an emergency response system;
a plurality of information-receiving interfaces, each information-receiving interface configured to receive, from a particular external source at a particular worldwide location, emergency information including one or more of electronic, textual, audio, and visual information;
processors configured to aggregate the emergency information received from the plurality of information-receiving interfaces and generate aggregated information for transmission to recipients identified by the up-to-date recipient information; and
a plurality of information-transmitting interfaces configured to transmit encrypted aggregated information to recipients identified by the up-to-date recipient information, the encrypted aggregated information triggering simultaneous activation of a plurality of emergency communications channels and providing emergency response information to a member of the emergency response system, including live video streaming from a location of an emergency.

2. The computer-implemented system of claim 1, wherein the plurality of information-receiving interfaces include communications interfaces supporting video protocols and communications over fourth generation (4G) and fifth generation (5G) global system for mobile (GSM) networks from unmanned aerial vehicle (UAV) drones that broadcast live video from disaster locations.

3. The computer-implemented system of claim 1, wherein the emergency information includes audio captured from microphones located at remote locations, and audio and video received from unmanned aerial vehicle (UAVs).

4. The computer-implemented system of claim 1, wherein the received information includes information obtained from man-made catastrophes and natural disasters.

5. The computer-implemented system of claim 1, wherein the particular external sources include websites that provide information over the Internet.

6. The computer-implemented system of claim 1, wherein the particular external sources include satellite sources that provide information obtained from satellites.

7. The computer-implemented system of claim 1, further comprising a plan-information interface configured to:
receive plan information for plans defined by personnel at business units; and
initiate the plans based on emergency information received during an emergency.

8. The computer-implemented system of claim 7, wherein the plans include business continuity plans, emergency response plans, disaster recovery plans, and incident response plans.

9. A computer-implemented method, comprising:
receiving up-to-date recipient information for recipients located worldwide;
receiving, from external sources, emergency information including one or more of electronic, textual, audio, and visual information;
aggregating and encrypting the emergency information to generate encrypted aggregated information for transmission to recipients identified by the up-to-date recipient information; and
transmitting the encrypted aggregated information to recipients identified by the up-to-date recipient information, the encrypted aggregated information including live video streaming.

10. The computer-implemented method of claim 9, wherein the up-to-date recipient information is received through communications interfaces supporting video protocols and communications over 4G and 5G GSM networks from UAV drones broadcasting live video from disaster locations.

11. The computer-implemented method of claim 9, wherein the emergency information includes audio captured from microphones located at remote locations, and audio and video received from UAVs.

12. The computer-implemented method of claim 9, wherein the received emergency information includes information obtained from man-made catastrophes and natural disasters.

13. The computer-implemented method of claim 9, wherein the external sources include websites that provide information over the Internet.

14. The computer-implemented system of claim 1, wherein the external sources include satellite sources that provide information obtained from satellites.

15. The computer-implemented method of claim 9, further comprising:
receiving plan information for plans defined by personnel at business units; and
initiating the plans based on the emergency information received during an emergency.

16. The computer-implemented method of claim 15, wherein the plans include business continuity plans, emergency response plans, disaster recovery plans, and incident response plans.

17. The computer-implemented method of claim 15, wherein receiving the up-to-date recipient information includes receiving recipient information from a direct human resources (HR) feed.

18. A non-transitory, computer-readable medium storing one or more instructions executable by a computer system to perform operations comprising:
receiving up-to-date recipient information for recipients located worldwide, wherein the recipients are members of an emergency response system;
receiving, from an external source, emergency information including one or more of electronic, textual, audio, and visual information;
aggregating and encrypting the emergency information to generate encrypted aggregated information for transmission to recipients identified by the up-to-date recipient information; and
transmitting the encrypted aggregated information to recipients identified by the up-to-date recipient information, the encrypted aggregated information triggering simultaneous activation of a plurality of emergency communications channels and providing emergency response information to a member of the emergency response system, including live video streaming from a location of an emergency.

19. The non-transitory, computer-readable medium of claim 18, wherein the up-to-date recipient information is received through communications interfaces supporting video protocols and communications over 4G and 5G GSM networks from UAV drones broadcasting live video from disaster locations.

20. The non-transitory, computer-readable medium of claim 18, wherein the emergency information includes audio captured from microphones located at remote locations, and audio and video received from UAVs.

* * * * *